(12) United States Patent
Hu et al.

(10) Patent No.: US 7,743,086 B2
(45) Date of Patent: Jun. 22, 2010

(54) DISTRIBUTED KERNEL DENSITY ESTIMATION

(75) Inventors: Yusuo Hu, Beijing (CN); Jian-guang Lou, Beijing (CN); Jiang Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 11/763,285

(22) Filed: Jun. 14, 2007

(65) Prior Publication Data

US 2008/0313188 A1 Dec. 18, 2008

(51) Int. Cl.
G06F 15/16 (2006.01)
(52) U.S. Cl. .................. 709/200; 709/203; 706/12; 706/14
(58) Field of Classification Search ............. 709/200, 709/201, 203, 226; 706/12, 14, 45, 46
See application file for complete search history.

(56) References Cited

U.S. PATENT DOCUMENTS

| 6,353,679 | B1 | 3/2002 | Cham et al. | |
|---|---|---|---|---|
| 6,529,953 | B1 | 3/2003 | Van Renesse | |
| 6,944,602 | B2* | 9/2005 | Cristianini | 706/12 |
| 6,963,604 | B2 | 11/2005 | Erdogmus et al. | |
| 7,299,213 | B2* | 11/2007 | Cristianini | 706/12 |
| 2004/0131368 | A1 | 7/2004 | Sawada et al. | |
| 2004/0167893 | A1 | 8/2004 | Matsunaga et al. | |
| 2004/0199482 | A1* | 10/2004 | Wilson | 706/25 |
| 2006/0221410 | A1 | 10/2006 | Suzuki | |
| 2006/0279440 | A1 | 12/2006 | Zhao et al. | |
| 2007/0003137 | A1 | 1/2007 | Cremers et al. | |

FOREIGN PATENT DOCUMENTS

WO WO0116880 A2 3/2001

OTHER PUBLICATIONS

Boscolo, et al., "Independent Component Analysis Based on Nonparametric Density Estimation", at <<http://www.eeweb.ee.ucla.edu/publications/journalVwaniRoychowdhuryvwani_trans-neural_jan04.pdf>>, IEEE, vol. 15, No. 1, Jan. 2004, pp. 55-65.

Boyd, et al., "Gossip Algorithms: Design, Analysis and Applications", available at least as early as Jun. 6, 2007, at <<http://www.stanford.edu/~boyd/reports/gossip_infocom.pdf>>, pp. 13.

Castanon, et al., "Distributed Estimation Algorithms for Nonlinear Systems ", at <<http://144.122.166.80/reading/texts/distributed_estimation/teneketzis_distributed_est_non_linear_systems.pdf>>, IEEE, vol. AC-30, No. 5, May 1985, pp. 418-425.

(Continued)

Primary Examiner—Frantz B Jean
(74) Attorney, Agent, or Firm—Lee & Hayes, PLLC

(57) ABSTRACT

The described systems and methods can be used to estimate the global distributed kernel density without prior information of data using a gossip based method. In the gossip based method, a node in a distributed network periodically selects and exchanges kernels with a random node in the network. After exchanging, both the initiating and the target node use the received kernels to update their local estimates. In addition, a data reduction method can be used to optimize the size of the kernel set at each node.

20 Claims, 8 Drawing Sheets

OTHER PUBLICATIONS

Kostoulas, et al., "Decentralized Schemes for Size Estimation in Large and Dynamic Groups", Proceedings of the 4th IEEE International Symposium on Network Computing and Applications (NCA '05) 2005.

Rabbat, et al., "Distributed Optimization in Sensor Networks ", at <<http://delivery.acm.org/10.1145/990000/984626/p20-rabbat.pdf?key1=984626&key2=5261211811&,coll=GUIDE&dl=GUIDE&CFID=20591093&CFTOKEN=42857486>>, ACM, 2004, pp. 20-27.

Tong, et al., "Optimality of Kernel Density Estimation of Prior Distribution in Bayes Network", Lecture Notes in Computer Science 4232, 2006, pp. 660-669.

Vlassis, et al., "Gossip-based greedy Gaussian mixture learning", available at least as early as Jun. 6, 2007, at <<http://www.cs.vu.nl/ci/DataMine/DIANA/papers/vlassis05pci.pdf>>, pp11.

Zhou, et al., "Epidemic Dynamics on Complex Networks", Progress in Natural Science, 2006, 16(5): pp. 452-464.

* cited by examiner

DISTRIBUTED KERNEL DENSITY ESTIMATION

BACKGROUND

Advances in network technology, like peer-to-peer networks on the Internet, sensor networks, etc., have highlighted the need for efficient ways to deal with large amounts of data distributed over a set of nodes. For example, in a peer-to-peer system, a user may need to learn about the global distribution of resources for indexing or load balancing. In another example, in a distributed agent system, each agent may need some global information of the environment through collaborative learning for decision making.

Some systems use gossip-based procedures based on parametric models, such as Gaussian mixture models, for data computation and distributed density estimation. In a gossip-based procedure or protocol, each node or node device in a system repeatedly contacts other nodes at random to exchange information. Gossip-based parametric models may not always be suitable for distributed learning, and are highly sensitive to initial parameters.

SUMMARY

This summary is provided to introduce simplified concepts of self healing software, described below in the Detailed Description. This summary is not intended to identify essential features of the claimed subject matter, nor is it intended for use in determining the scope of the claimed subject matter.

In an embodiment, a computing system includes a network and a plurality of node devices connected to the network, each node device having local measurements that are independent and identical distributed samples of a random variable. Each node device uses gossip-based distributed kernel density estimation to estimate an unknown distribution from the distributed samples using kernel density estimation.

BRIEF DESCRIPTION OF DRAWINGS

In the figures, the left-most digit of a component reference number identifies the particular figure in which the component first appears.

FIG. 4b illustrates an exemplary graph showing a change of KL-Divergence values for the 1D data set used in FIG. 4a.

FIG. 5b illustrates an exemplary graph showing the estimation results of global KDE for the 2D dataset shown in the FIG. 5a.

FIG. 6a illustrates an exemplary graph showing the estimation results of distributed KDE on a random node for the 2D dataset shown in the FIG. 5a.

FIG. 6b illustrates an exemplary evaluation graph showing a change of KL-Divergence values for the 2D data set shown in the FIG. 5a.

DETAILED DESCRIPTION

The following disclosure describes systems and methods for distributed kernel density estimation using a gossip-based protocol. Gossip-Based Distributed Kernel Density Estimation is a non-parametric technique that can estimate arbitrary distribution from empirical data without prior information. The kernel density estimation technique incrementally collects information and approximates the global KDE through the gossip mechanism. A data reduction method can be used with the estimation technique to deal with constraints such as, limited resources and power constraints While aspects of the described systems and methods for estimating kernel density based on non-parametric model can be implemented in any number of different computing systems, environments, and/or configurations, implementation of distributed kernel density estimation and data reduction are described in the context of the following exemplary system architecture(s).

An Exemplary Computing System

Figure 1:
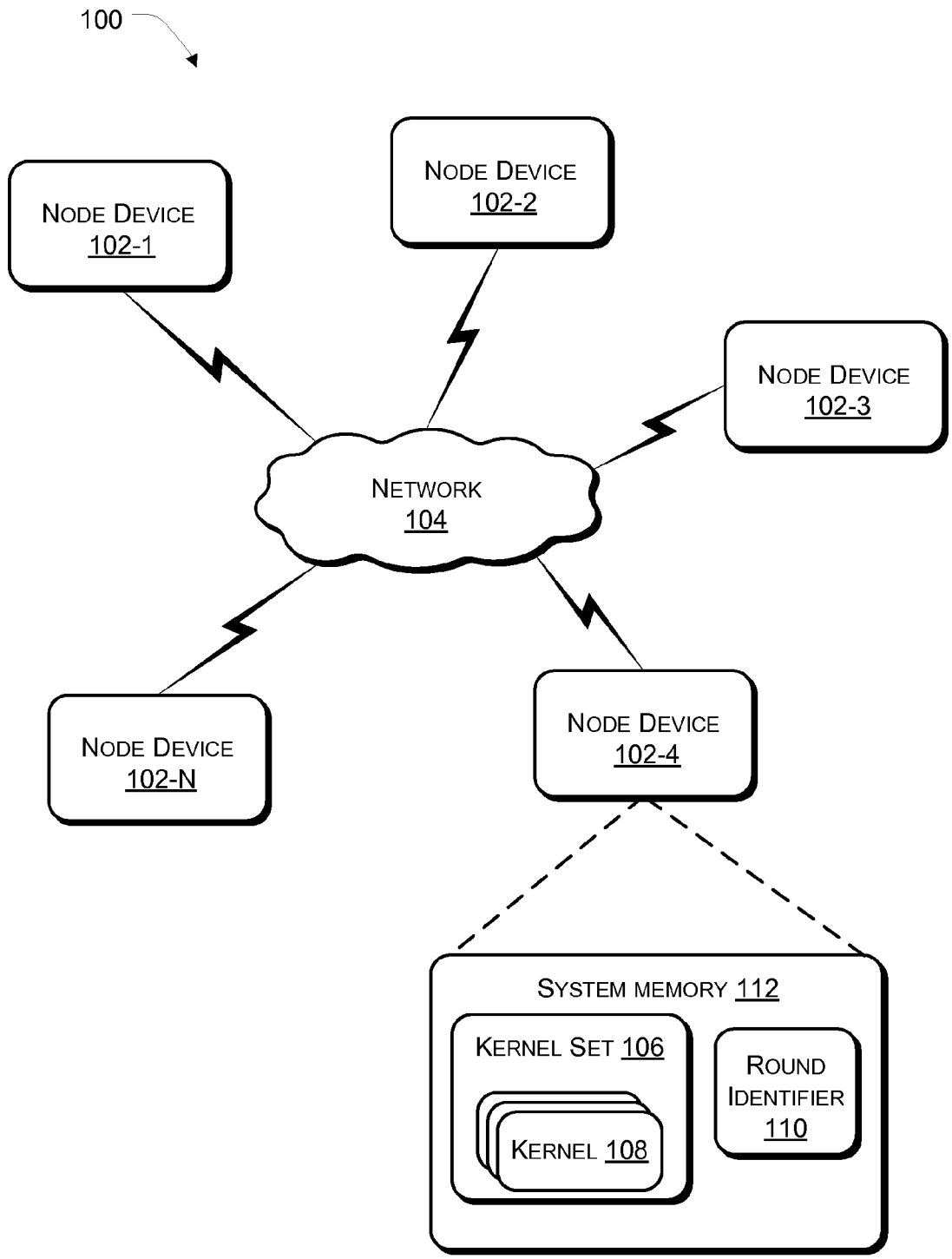
FIG. 1 shows an exemplary computing system.

FIG. 1 illustrates an exemplary computing system 100 which can be used to implement the techniques described herein, and which may be representative, in whole or in part, of the elements described herein. The computing system 100 is an example of a computing system and is not intended to suggest any limitation to the scope of use and/or functionality of the computer and network architectures.

The computing system 100 can include a plurality of node devices or nodes 102-1, 102-2, 102-3, 102-4 . . . 102-N, collectively referred to as nodes 102. Nodes 102 can communicatively linked to one another through a network 104. The nodes 102 can be, for example, a desktop PC, a handheld PC, a notebook or laptop, a PDA, a sensor, a peer, an agent, and any other computing device. As shown for example, by node device or node 102-4, each of the nodes 102 may have a kernel set 106 that includes a plurality of kernels 108, and a round identifier 110 stored in a system memory 112.

The distributed network 104 can have a plurality of distributed nodes, where each node i, such as the node device or node 102-1, has a local measurement $x_i$. The local measurements $x_i$ are independently and identically distributed (i.i.d) samples of a random variable X with an unknown distribution F. The system 100 can use one or more underlying communication mechanisms for communication amongst the plurality of nodes 102 in the network 104.

The network 104 may be a wireless or a wired network, or a combination thereof. The network 104 can also be a collection of individual networks, interconnected with each other and functioning as a single large network (e.g., the Internet or an intranet). Examples of such individual networks include, but are not limited to, Local Area Networks (LANs), Wide Area Networks (WANs), and Metropolitan Area Networks (MANs). Further, the individual networks may be wireless or wired networks, or a combination thereof.

The system memory 112 can include computer readable media in the form of volatile memory, such as random access memory (RAM), and/or non-volatile memory, such as read only memory (ROM). RAM typically contains data and/or program modules that are immediately accessible to and/or presently operated on by the processor.

In an implementation, the nodes 102 use a gossip-based distributed kernel density estimation method to estimate the unknown distribution F from data samples using kernel density estimation or KDE. KDE is an exemplary nonparametric method for density estimation.

For a kernel set having i.i.d data samples $\{x_i, i=1, \ldots N, x_i \in R^d,\}$ from some unknown distribution $f$, the kernel density estimation of $f$ can be defined as follows:

$$\hat{f}(x) = \sum_{i=1}^{N} w_i K_{H_i}(x - x_i), \quad (1)$$

where $$K_{H_i}(x - x_i) = |H_i|^{-\frac{1}{2}} K\left(H_i^{-\frac{1}{2}}(x - x_i)\right) \quad (2)$$

is the $i^{th}$ kernel located at $x_i$. $H_i$ is a symmetric and positive bandwidth matrix of node i. Furthermore, $w_i$, $i=1, 2, \ldots, N$, is the sample weight of the respective N kernels of node i, satisfying the following condition:

$$\sum_{i=1}^{N} w_i = 1. \quad (3)$$

The kernel function $K(\cdot)$ may be a d-variate non-negative, symmetric, real-value function satisfying:

$$\int_{R^d} K(x) dx = 1, \quad (4)$$

$$\int_{R^d} x K(x) dx = 0,$$

$$\int_{R^d} xx^T K(x) dx = c_k I,$$

$$\lim_{\|x\| \to \infty} \|x\|^d K(x) = 0$$

where $c_k$ is a constant. There are number of possible kernel functions. The most common one is the following exponential kernel function:

$$K(x) = \frac{1}{(2\pi)^{d/2}} \exp\left(-\frac{1}{2} x^T x\right). \quad (5)$$

In the distributed density estimation method, each node i gets an estimate of the global distribution F, or a probability density function f. This is performed by incrementally collecting information and approximating the global KDE through a gossip process. The gossip process takes place with the assumption that there is an underlying communication mechanism for any two nodes in the system to establish either a physical or virtual communication channel to exchange messages.

In an implementation, a unique and increasing round identifier 110 is attached to each gossip message, so that the gossip messages of each round can be distinguished from all other rounds. When a node i (i.e., node device 102) receives the round identifier 110 greater than the value of the current round identifier 110, then the node i immediately joins the new estimation process.

The KDE given by equation (1) can be used to approximate an arbitrary distribution with any given precision (i.e., KDE is asymptotically consistent with the underlying distribution). KDE can be used to generate the local estimate using a few samples and can be used to approximate the underlying distribution based on the local estimate.

An Exemplary Process

The systems and methods for estimating a global kernel density estimate (KDE) of empirical data without prior information are described in the general context of computer-executable instructions being executed by a computing device, such as a personal computer. Computer instructions generally include routines, programs, objects, components, data structures, etc., that perform particular tasks or implement particular abstract data types. While the systems and methods are described in the foregoing context, acts and operations described hereinafter can be implemented in hardware or other forms of computing platforms.

Figure 2:
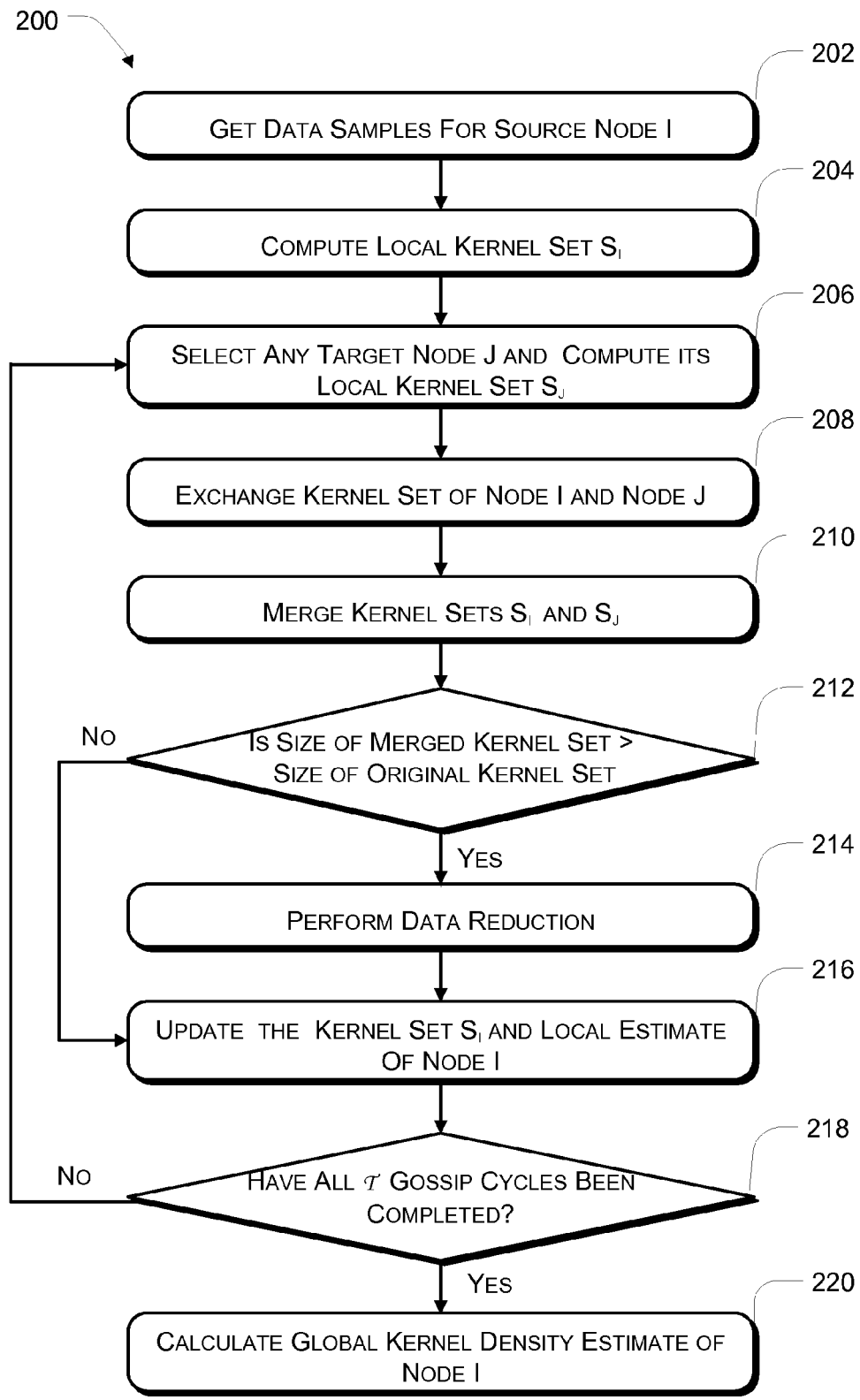
FIG. 2 shows an exemplary process for distributed kernel density estimation.
Figure 3:
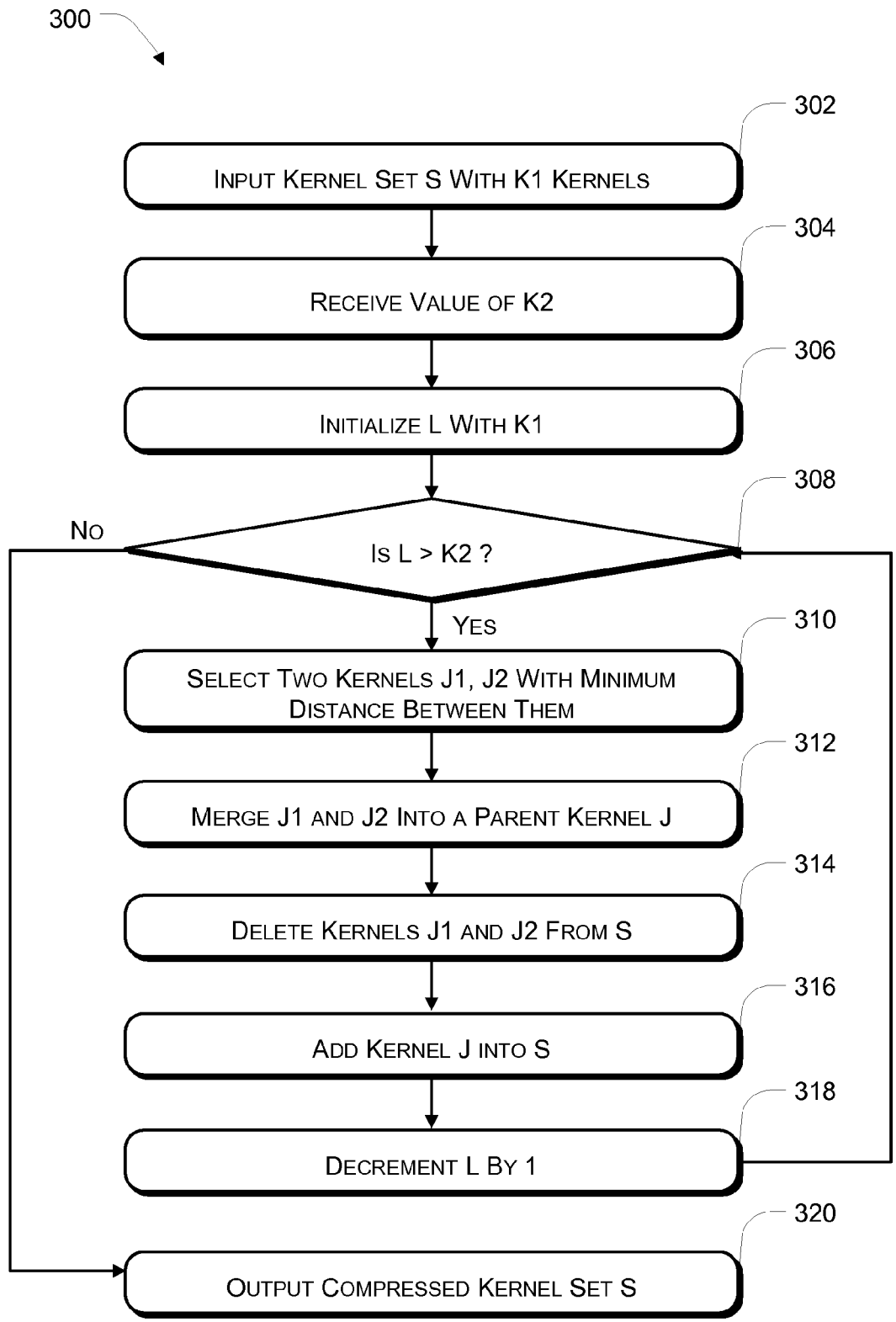
FIG. 3 shows an exemplary method for data reduction.

FIGS. 2 and 3 illustrate processes 200 and 300 as a collection of blocks in a logical flow graph representing a sequence of operations that can be implemented in hardware, software, firmware or a combination thereof. The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein.

In the context of software, the blocks represent computer instructions that, when executed by one or more processors, perform the recited operations. For discussion purposes, the process 200 is described with reference to the environment 100 shown in FIG. 1, and the process 300 is described with reference to the environment 100 shown in FIG. 1 and process 200 shown in FIG. 2.

FIG. 2 shows an exemplary process to estimate the kernel density. At block 202, i.i.d. samples of a random variable X with unknown distribution f are obtained for each node i.

At block 204, each node i, for example node 102-1, maintains a local kernel set 106 ($S_i$) which is represented by the following expression:

$$S_i = \{\langle w_{i,l1}, x_{i,l1}, H_{i,l1}\rangle, l_1 = 1, \ldots, N_i\} \quad (6)$$

where $N_i$ represents the current number of kernels on node i, and $\langle w_{i,l_1}, x_{i,l_1}, H_{i,l_1}\rangle$ is $1_1^{th}$ kernel of the node i. Also, $x_{i,l_1}$ is the location of the $1_1^{th}$ kernel, $w_{i,l_1}$, and $H_{i,l_1}$ are the weight and bandwidth matrix of the $1_1^{th}$ kernel of node i respectively. Initially, each node i has a kernel represented as $\langle w_{i,1}, x_{i,1}, H_{i,1}\rangle$. In such a case, the local kernel of node i has a weight $w_{i,1}=1$, and a location $x_{i,1}=x_i$, and a bandwidth matrix $H_{i,1}=H_i$.

At block 206, a random node j, for example node 102-2, is selected as a gossip target node and a local kernel set 106 ($S_j$) of node j is represented by the following expression:

$$S_j = \{\langle w_{j,l_2}, x_{j,l_2}, H_{j,l_2}\rangle, l_2 = 1, \ldots, N_j\} \quad (7)$$

where $N_j$ represents the current number of kernels on node j, and $\langle w_{j,l2}, x_{j,l2}, H_{j,l2}\rangle$ is $1_2^{th}$ kernel of the node j. Also $x_{j,l_2}$ is the location of the $1_2^{th}$ kernel of node j, $w_{j,l_2}$ and $H_{j,l_2}$ are the respective weight and bandwidth matrix of the $1_2^{th}$ kernel of node j. Initially, each node j has only one kernel represented by $\langle w_{j,1}, x_{j,1}, H_{j,1}\rangle$. In such a case, the local kernel sample of node j has a weight $w_{j,1}=1$, and a location $x_{j,1}=x_j$, and a bandwidth matrix $H_{j,1}=H_j$.

At block 208, the kernels 108 of kernel set 106 from node i, referred to as 108i and the kernels 108 of kernel set 106 from node j, referred to as 108j are exchanged (i.e., a copy of a plurality of the kernels 108i from node i is sent to node j and a copy of a plurality of the kernels 108j from node j is sent to node i):

At block 210, at node i, the local kernels 108i from node i are merged with the kernels 108j received from node j. The node i's local kernel set 106 is then updated in the following manner described by the expression:

$$S_{new}^{i} = \{\langle w'_{i,l_1}, x_{i,l_1}, H_{i,l_1}\rangle, l_1=1,\ldots,N_i\} \cup \{\langle w'_{j,l_2}, x_{i,l_2}, H_{i,l_2}\rangle, l_2=1,\ldots,N_j\} \quad (8)$$

where $$w'_{i,l_1} = \frac{1}{2} w_{i,l_1}, \text{ and } w'_{j,l_2} = \frac{1}{2} w_{j,l_2}$$

are the corresponding updated weights of node i and node j and $S_{new}^{i}$ is the recently updated kernel set 106 of node i. The updating process at node i thus includes the merging of kernels 108i from node i with kernels 108j received from node j having the same location and bandwidth matrix, and summing of their corresponding weights together.

Hence, the merging process increases the count of the number of kernels 108i of the local kernel set 106 on each node i. To this end, each node i can collect multiple kernels 108i to estimate the global density distribution, and the local estimate on each node i approaches the global KDE as the process progresses.

At block 212, it is determined whether the size of the merged kernel set 106 at node i exceeds the resources of node i or not. If the merged kernel set 106 exceeds the node i's resources (i.e., following the "yes" branch from block 212), then the method 200 moves from block 212 to block 214 to perform data reduction. If the size of the merged kernel set 106 does not exceed the size of the node i's resources (i.e., following the "no" branch from the block 212), then the method 200 proceeds from block 212 to block 216 to update the local estimate of the kernel set 106 at node i.

At block 214, a data reduction method is performed at node i in which two kernels of kernel set 106 of node i having the minimum distance between their locations are chosen. Then, the chosen kernels of kernel set 106 of node i are merged into a new kernel of the kernel set 106 so that the size of the merged kernel set 106 does not exceed the size of the resources of the node i. Data reduction method is explained in detail later with reference to FIG. 3.

At block 216, the kernel set 106 of node i is updated, after the merging at block 210, if the "yes" path is traced from the block 212 or after the execution of data reduction method 300 at block 214 if the "no" path is traced from the block 212. Further at block 216, the local estimate of node i is computed. According to equation (1), the local estimation of the probability density function on node i is calculated by using the following equation:

$$\hat{f}_i(x) = \sum_{l=1}^{N_i} w_{i,l} K_{H_{i,l}}(x - x_{i,l}) \quad (9)$$

At block 218, it is determined whether τ gossip cycles have been completed. The factor 'τ' represents the number of gossip cycles to be performed to calculate the global kernel density estimate. The number of gossip cycles τ, can be determined using the property that for any value of ε, δ>0, after $$\frac{\log\left(\frac{N^2}{\delta\varepsilon^2}\right)}{\log(2\sqrt{e})}$$

gossip cycles, the relative estimation error on node i satisfies the following probability condition:

$$P(e_i < \varepsilon) \geq 1 - \delta \quad (10)$$

where the relative estimation error $e_i$ on node i is given by $$e_i = \frac{\|\hat{f}_i - \hat{f}\|}{\|\hat{f}\|}, \quad (11)$$

where ∥.∥ is the $L^P$-norm of the real function, $\hat{f}_i(x)$ is the local density estimation based on the kernel sets 106 $S_i$, at the end of a gossip cycle and is given by $$\hat{f}(x) = \sum_{i=1}^{N} w_i K_{H_i}(x - x_i).$$

The relative estimation error $e_i$ on node i can be used to analyze the consistency and convergence speed of the estimation process 200.

It can be proved that the relative estimation error on node i satisfies the probability condition represented by the equation (10) as follows.

Since, all kernels 108i of node i are made from the original data samples, the local density estimation at node i given by the following equation:

$$\hat{f}_i(x) = \sum_{l=1}^{N_i} w_{i,l} K_{H_{i,l}}(x - x_{i,l}) \quad (12)$$

can be represented as $$\hat{f}_i(x) = \sum_{l=1}^{N_i} \tilde{w}_{i,k} K_{H_{i,k}}(x - x_{i,k}), \quad (13)$$

where $\tilde{w}_{i,k}$ is the weight of the kernel 108 (say kernel 'k') of kernel set 106 of node i which corresponds to the original data sample $x_k$ and the weight of kernel 108 (e.g., kernel 'k') of node i is taken to be $\tilde{w}_{i,k}=0$ if the sample $x_k$ is not located in kernel set 106 (e.g., $S_i$) of node i.

For a random node (e.g., node j) that is a gossiping target node in cycle τ, a local estimate at node j given by the equation:

$$\hat{f}_j(x) = \sum_{l=1}^{N_j} w_{j,l} K_{H_{j,l}}(x - x_{j,l}) \quad (14)$$

can be represented as $$\hat{f}_j(x) = \sum_{k=1}^{N} \tilde{w}_{j,k} K_{H_k}(x - x_k), \quad (15)$$

where $\tilde{w}_{j,k}$ is the weight of the kernel 108 (e.g., kernel 'k') of kernel set 106 of node j corresponding to the original data sample $x_k$ and the weight of kernel 108 (e.g., kernel 'k') of node j is taken to be $\tilde{w}_{j,k}=0$ if the sample $x_k$ is not presented in kernel set 106 (e.g., $S_j$) of node j.

The completion of a gossip cycle results in the updated kernel sets at node i and node j which are identical (i.e., $S_i'=S_j'$ where $S_i'$ is the updated kernel set 106 of node i and $S_j'$ is the updated kernel set 106 of node j and the new local estimates are represented by the weighted sum of original kernels). Thereby, the new sample weights $\tilde{w}_{i,k}$ of node i and $\tilde{w}_{j,k}$ of node j are also identical, and are represented by the following expression:

$$\tilde{w}_{i,k}^{\tau} = \tilde{w}_{j,k}^{\tau} = \frac{\tilde{w}_{i,k} + \tilde{w}_{j,k}}{2} \quad (16)$$

Thus, the gossip process averages the weights of the original data samples as shown in the above equation (16). For a data sample $x_k$ of kernel 108 (say 'k') of node i, the $\mu_{\tau,\kappa}, \sigma_{\tau,\kappa}^2$ are the mean and variance of the weight $\tilde{w}_{i,k}$ of the kernel 108 (e.g., 'k') in the $\tau$-th gossip cycle at node i. The mean value of all the weights of all the kernels 108 (e.g., 'N') of node i or node j in $\tau$ gossip cycles remains unchanged (i.e., $\mu_{\tau,\kappa}=\mu=1/N$), while the variance of their kernel weights $\sigma_{\tau,\kappa}^2=\sigma_{\tau}^2$ reduces rapidly during the gossip process.

According to the property of the averaging process, when the selection of gossip target j is uniform and random the reduction rate of the variance of the kernel 108 weights satisfies the following expression:

$$\sigma_{\tau}^2 = \frac{1}{2\sqrt{e}} \sigma_{\tau-1}^2 \quad (17)$$

and replacing $\sigma_0^2=1/N$ in equation (17), the following equation can be obtained $$\sigma_{\tau}^2 = \frac{1}{N}\left(\frac{1}{2\sqrt{e}}\right)^{\tau} \quad (18)$$

In the $\tau$-th gossip cycle of the exemplary process 200, the relative estimation error on node i is bounded by:

$$e_i^{\tau} = \frac{\|\hat{f}_i^{\tau} - \hat{f}\|^2}{\|\hat{f}\|} \quad (19)$$

$$= \frac{N\left\|\sum_{k=1}^{N}\left(\tilde{w}_{i,k}^{\tau} - \frac{1}{N}\right) K_{H_k}(x - x_k)\right\|}{\left\|\sum_{k=1}^{N} K_{H_k}(x - x_k)\right\|}$$

$$\leq N \max_k \left|\tilde{w}_{i,k}^{\tau} - \frac{1}{N}\right|$$

$$\leq N \left(\sum_{k=1}^{N}\left(\tilde{w}_{i,k}^{\tau} - \frac{1}{N}\right)^2\right)^{1/2}$$

Using Markov inequality condition and $$E\left(\sum_{k=1}^{N}\left(\tilde{w}_{i,k}^{\tau} - \frac{1}{N}\right)^2\right) = N\sigma_{\tau}^2,$$

the following conditional expression is inferred $$P(e_i^{\tau} < \varepsilon) \geq 1 - \delta \quad (20)$$

$$\text{when } \tau \geq \frac{\log\left(\frac{N^2}{\delta\varepsilon^2}\right)}{\log(2\sqrt{e})}$$

The above mentioned description of proof of the probability condition shows that the relative estimation error of the exemplary process decreases exponentially and the local estimate at each node i converges to the global estimate in O (log N) steps. The number of kernels of node i transmitted in one gossip cycle do not exceed the number of initial data samples N, and hence there will be at most O (N log N) kernels to be transmitted totally.

The above mentioned description of proof of the probability condition shows that the relative estimation error of the exemplary process decreases exponentially and the local estimate at each node i converges to the global estimate in O (log N) steps. The number of kernels of node i transmitted in one gossip cycle do not exceed the number of initial data samples N, and hence there will be at most O (N log N) kernels to be transmitted totally.

Continuing with method 200, if all the r gossip cycles are completed (i.e., following the "yes" branch from the block 218) then the global KDE is computed for all nodes at block 220. If all the r gossip cycles are not completed (i.e. following the "no" branch from the block 218) then the process proceeds to the block 206 to restart the computation of the local kernel estimate of the node i in order to complete all the r gossip cycles for node i.

At block 220, the global kernel density estimate is computed using the following equation:

$$\hat{f}(x) = \sum_{i=1}^{N} w_i K_{H_i}(x - x_i) \quad (21)$$

where $\hat{f}(x)$ represent the estimated global kernel density of the data sample x.

Though the above method 200 has been described with reference to a node i actively seeking data samples from a random node j for KDE, it will be understood that a similar process can be followed by node i when the node i passively receives a message from a node j for exchanging kernels (i.e., gossip).

In an implementation of the method 200, the resource limitation at a node i does not affect the execution of the exemplary process 200 in the network environment 104. For example, this can occur when each node i has storage space to store at most N local kernels in their memory (e.g., memory 112) and communication capability to transmit at most N kernels during each gossip cycle. In another implementation, the distributed estimation process can be extended to meet the resource constraint requirements.

In an exemplary resource constrained computing environment 104, the communication bandwidth between the nodes may be limited by a channel capacity. During execution of exemplary process 200, the complete local kernel set 106 from one node i is sent to another node j during a single gossip cycle, when the communication bandwidth is not limited.

The node i has limited storage capability to store a large kernel set 106. The number of kernels actually stored at a node i may thus be less than the total number of available data samples to be stored at node i. This can result in a loss of information.

The following exemplary method can overcome the storage constraints and avoid the loss of the information, by pre-defining a set of parameters of the exemplary gossip process 200 to limit the resource consumption during the execution of the exemplary process 200. In the exemplary process, the maximum number of kernels that can be sent from a node i to a random node j in each gossip cycle is set as L and the maximum number of kernels that can be stored at each node i is set as M, and the final estimate is represented by at most M kernels.

An Exemplary Data Reduction Method

FIG. 3 shows an exemplary data reduction method according to an embodiment. The data reduction method facilitates estimation of the global kernel density with a small set of data samples, where the data samples are compressed until their size drop below a communication or storage constraint. During the exemplary process 200, the data reduction method 300 can be employed whenever the size of kernel set exceeds the communication or storage constraints.

The data reduction method 300 is an exemplary method for constructing a KD-tree structure in a bottom-up approach. Considering an input density estimate $\{\langle w_l, x_l, H_l \rangle, l=1, \ldots, K_1\}$ represented by $K_1$ number of kernels, where $w_l$, $x_l$, and $H_l$ are respectively the weight, location, and bandwidth matrix of the kernel l of the input density estimate of node i; and an output density estimate $\{\langle w'_l, x'_l, H'_l \rangle, l=1, \ldots, K_2\}$ represented by $K_2$ number of kernels where $w'_l$, $x'_l$, and $H'_l$ are respectively the weight, location, and bandwidth matrix of output density estimate of node i. The output density estimate $\{\langle w'_l, x'_l, H'_l \rangle, l=1, \ldots, K_2\}$ represented by $K_2$ number of kernels approximate the original density estimate $\hat{f}(X)$ when the condition $K_2 < K_1$ is satisfied. The data reduction method is proceeded for $K_1 - K_2$ iterations to approximate the original density estimate. During each iteration of $K_1 - K_2$ iterations, any two kernels 108 of the original or input density estimate of node i are chosen which have minimum distance between their locations and then merged into a new kernel. The completion of $K_1 - K_2$ iterations output a kernel set which has in total $K_2$ number of kernels 108 in a kernel set 106 of node i. The data reduction method 300 is described in detail below.

At block 302, a kernel set S with $K_1$ number of kernels of node i is assumed to be an input kernel set 106. The input kernel set S is represented by the following expression:

$$S = \{\langle w_i, x_i, H_i \rangle, i=1, \ldots, K_1\} \quad (22)$$

At block 304, a value of $K_2$ is received as input which represents the number of kernels in a compressed kernel set (i.e., in the output kernel set S). The value of $K_2$ received satisfies the following condition:

$$K_2 \leq M \quad (23)$$

where M denotes the maximum number of kernels 108 that can be stored at each node i.

At block 306, a temporary variable "l" is initialized with the value of $K_1$, where $K_1$ is the number of kernels of input kernel set 106 of node i defined at block 302.

At block 308, it is determined whether the condition represented by the expression $l > K_2$ is satisfied or not. The temporary variable l in the condition is received as input as shown in block 306 and $K_2$ is the number of kernels in the compressed kernel set 106 of node i defined at block 304. If the condition is satisfied (i.e., following the "yes" branch from block 308) then the method 300 moves from block 308 to block 310 and if the condition is not satisfied (e.g. following the "no" branch from block 308), then the method 300 moves from block 308 to block 320.

At block 310, any two kernels 108 of node i (e.g., the two kernels can be $j_1$ and $j_2$) are selected which have a minimal distance between the centers or locations $x_{j1}$ and $x_{j2}$ of kernels $j_1$ and $j_2$ respectively.

At block 312, the kernels $j_1$ and $j_2$ of node i are merged to create a new kernel j. The new kernel j is a parent kernel in the compressed kernel set S of node i. The method of merging two kernels $j_1$ and $j_2$ of node i is performed according to the following rule:

$$w'_j = w_{j1} + w_{j2}$$

$$x'_j = \frac{w_{j1} x_{j1} + w_{j2} x_{j2}}{w_{j1} + w_{j2}} \quad (24)$$

$$H'_j = \frac{w_{j1}(H_{j1} + x_{j1} x_{j1}^T) + w_{j2}(H_{j2} + x_{j2} x_{j2}^T)}{w_{j1} + w_{j2}} - x'_j x'^T_j$$

where $w_{j1}$ and $w_{j2}$ are the respective weight of the kernels $j_1$ and $j_2$ of node i; $x_{j1}$ and $x_{j2}$ are the respective centers or locations of the kernels $j_1$ and $j_2$ of node i; $H'_{j1}$ and $H'_{j2}$ are the respective bandwidth matrix of the kernels $j_1$ and $j_2$ of node i; $w'_j$, $x'_j$ and $H'_j$ are the weight, location and bandwidth matrix of the parent kernel j of the compressed kernel set S of node i respectively At block 314, the kernels $j_1$ and $j_2$ of node i are removed from the kernel set S of node i. The removal of the kernels $j_1$ and $j_2$ from the kernel set S of node i thereby increase the available storage space in the kernel set S.

At block 316, the parent kernel j is stored in the compressed kernel set S.

At block 318, the value of the temporary variable l defined at block 306 is lessened by 1. The method then proceeds to block 308 to continue the next iteration until all the $K_1$–$K_2$ iterations are completed. After all the iterations are completed, then the method proceeds to the block 320 to output the compressed kernel set of node i.

At block 320, the compressed kernel set is the output kernel set with kernels $K_2 \{ \langle w'_j, x'_j, H'_j \rangle j=1, \ldots, K_2\}$ approximating the original density estimate, thereby completing the data reduction method 300.

There can be some loss of information during the data reduction procedure 300 which can influence the accuracy of the exemplary process 200. The information loss by the data reduction method 300 is determined by the parameters L and M, where L denotes the maximum number of kernels that can be sent from node i to node j in each gossip cycle, and M denotes the maximum number of kernels that is stored at each node i. Parameters L and M are adjusted to achieve a trade-off between the overhead (i.e., bandwidth and storage) and the performance (i.e., accuracy and speed) of the exemplary process 200.

Practical considerations can be implemented in the exemplary computing environment and in the exemplary process to extend their working capability. These practical considerations are described in detail in the foregoing context of the description.

The exemplary process 200 can be executed with initialization of one data sample or kernel 108 in a local kernel set 106 for each node i. In an alternate embodiment, there is a need to hold more than one kernel 108 in the kernel set 106 at each node i. In this case, the initial local kernel set 106 on each node i can contain a plurality of kernels 108 in its local kernel set 106. Thus, the exemplary process 200 can be extended to satisfy the needs of the alternate embodiment as well.

In the exemplary computing environment 100 (e.g., a large scale distributed system), a global clock which synchronizes the execution of the estimation process in all the nodes (i.e., collectively nodes 102) may not be available. In another exemplary computing environment 100 (e.g., dynamic systems, the nodes can dynamically join and leave the network. In such a case, the exemplary estimation process 200 can be restarted to provide an up-to-date distribution estimate. Restarting the exemplary estimation process 200 can be made by running the estimation process 200 for a plurality of rounds. The total length of all the rounds is represented by $\Delta = N_c \delta$, where $\delta$ is the length of a gossip cycle, and $N_c$ is the number of cycles in a round, and a new instance of the distributed KDE is started in each round.

In an implementation, a unique and increasing round identifier 110 is attached to each gossip message, so that the gossip messages of each round can be distinguished from all other rounds. When a node i receives the round identifier 110 greater than the value of the current round identifier 110, then the node i immediately joins the new estimation process. At any time, the result of the final round may be considered as the current estimate of the density distribution. Further, newly joining nodes can get the current estimate immediately from the other nodes and participate in the next round of estimation.

The choice of a bandwidth matrix can also influence the estimation results. During experimentations of the exemplary process, the global bandwidth matrix is set to $H_i = h^2 I$ where 'h' is the bandwidth value and I refers to the identity matrix. The value of h is usually set small to obtain good estimation result. The bandwidth matrix $H_i$ can also be estimated from the local kernel set 106 during the gossip process by applying one of several data-driven methods. Hence the exemplary process 200 can be used with bandwidth selection method known in the art.

For example, where the computing environment is a sensor network, the nodes may be able to only contact their connected neighbor nodes. Hence, it may become difficult for a node i to select a random gossip target node j from all other nodes 102 to exchange messages in a gossip cycle during the execution of the exemplary process 200. But still a similar estimation result can be obtained by periodically exchanging local estimate of node i only with its neighbor nodes.

In another example, where the computing environment is a peer to peer or P2P network, the target gossip node j can be selected from other nodes 102 by the deployment of a peer sampling service over the network 104. The peer sampling service can provide each node i, a randomly updated node cache through periodic exchanges to update the nodes 102 in the cache.

Exemplary Experimentations and Analysis

The performance of the gossip-based non-parametric kernel density estimation method 200 can be evaluated on a number of datasets with different sizes, dimensions and distribution. The robustness of the exemplary process 200 with frequent node failures is also examined by simulating a computing environment 100 which includes a number of connected nodes collectively 102. Initially, each node can hold one data sample which can be drawn from an underlying distribution. An exemplary process 200 is implemented on these nodes for a number of gossip cycles and the estimation result is investigated.

To quantitatively analyze the estimation accuracy and to compare with other implementations, the Kullback-Leibler divergence or KL-divergence is used as the performance metric of the estimation process. During the experiments, the change of local density estimate on each node is monitored and the K-L divergence from the baseline distribution is calculated, which may be the global KDE or the underlying distribution, to the local estimate.

Exemplary Simulation Results

Figure 4A:
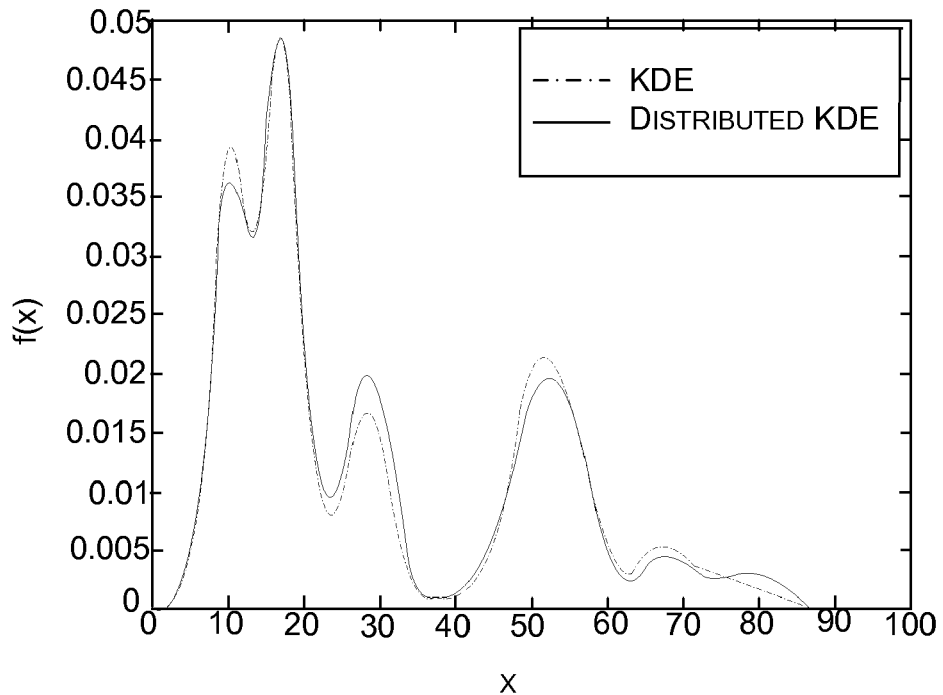
FIG. 4a illustrates an exemplary graph showing both global and distributed kernel density estimation results for a 1D data set.
Figure 4B:
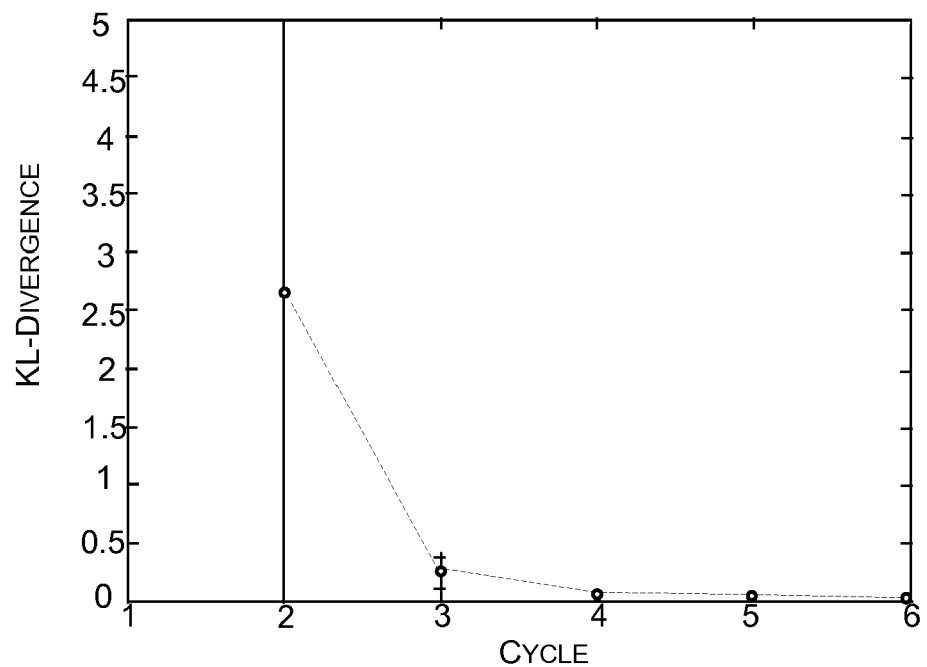

FIGS. 4a & 4b show an exemplary graph showing the exemplary simulation result on a one dimensional or 1D dataset, which has 200 samples drawn from five (5) mixed Gaussian distribution. Such an overlapped distribution (five weighted Gaussians with different variances) can be difficult to estimate even in global settings.

FIG. 4a shows an exemplary graph showing the local estimation result of 1D dataset on a node after six (6) gossip cycles where the X-axis represents the samples or the datasets and the Y-axis represent the probability distribution of all the samples or the datasets plotted in the X-axis. The global KDE result is plotted as a dotted lines and the original KDE is plotted as a solid straight line. Further shown is an exemplary graph showing the estimated curve of the exemplary process closer to the global KDE curve.

To further verify the overall performance of the exemplary process, the K-L divergence from the global KDE result is calculated on each node in each gossip cycle. Then, the mean and variance of the K-L divergence values from all nodes within each gossip cycle is computed.

FIG. 4b shows an exemplary graph showing the change in the values of K-L divergence for each gossip cycle. Here the X-axis represents the gossip cycles and the Y-axis represents the K-L divergence values for all nodes in each gossip cycle. Both the mean and the variance decreases exponentially, and after four cycles, the estimation errors on most nodes drop to a small value. Distributed KDE estimation process can also be tested on higher-dimensional datasets.

Figure 5A:
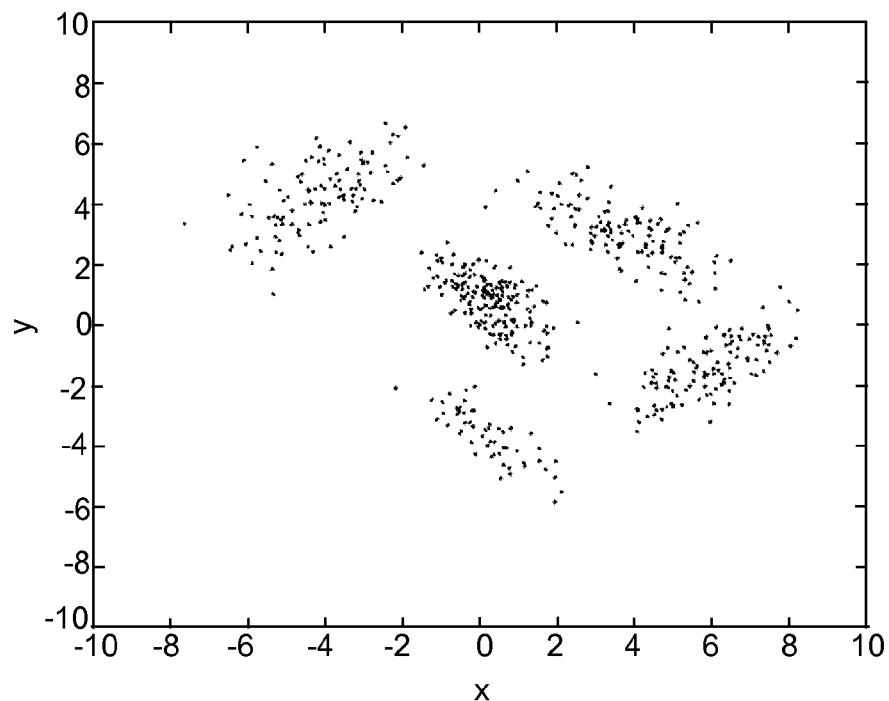
FIG. 5a illustrates an exemplary graph showing location of original 2D data samples.

FIGS. 5a, 5b, 6a, and 6b shows exemplary graphs showing the estimation result on a two dimensional or 2D dataset which has 600 samples drawn from a mixed distribution of five (5) Gaussian components. FIG. 5a shows an exemplary graph showing the location of the original data samples.

Figure 5B:
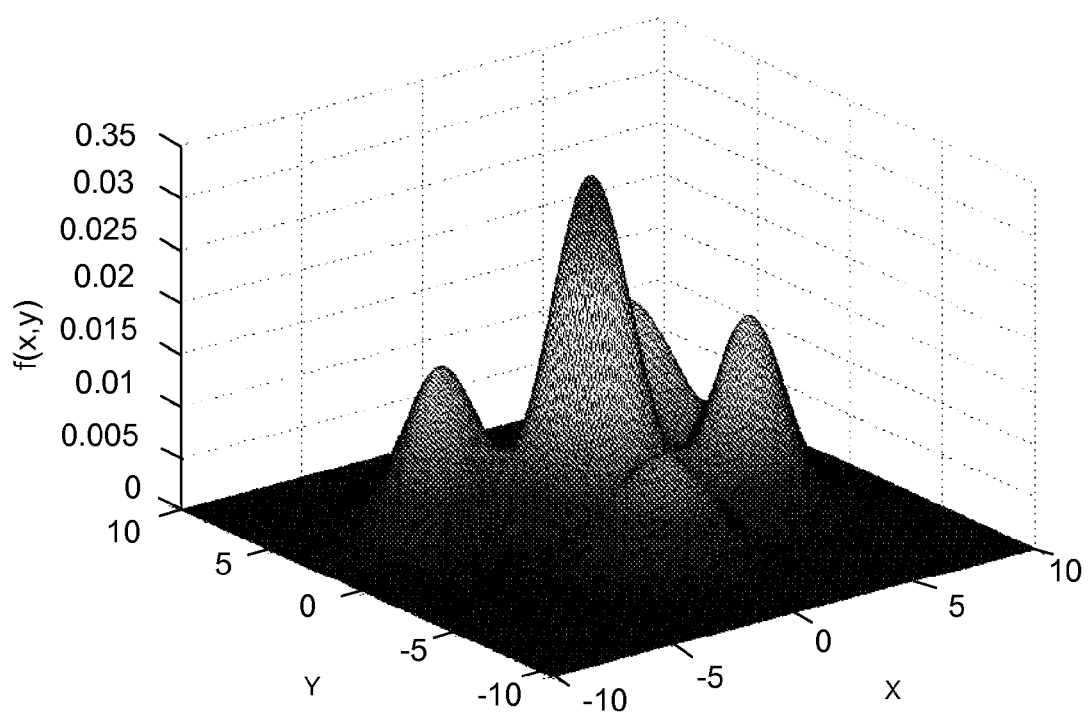

FIG. 5b shows an exemplary graph showing the result of global KDE, where the X-axis and Y-axis represents the 2D data samples and the Z-axis represents the global KDE values for all of the data samples of all the nodes in the computing environment 100.

Figure 6A:
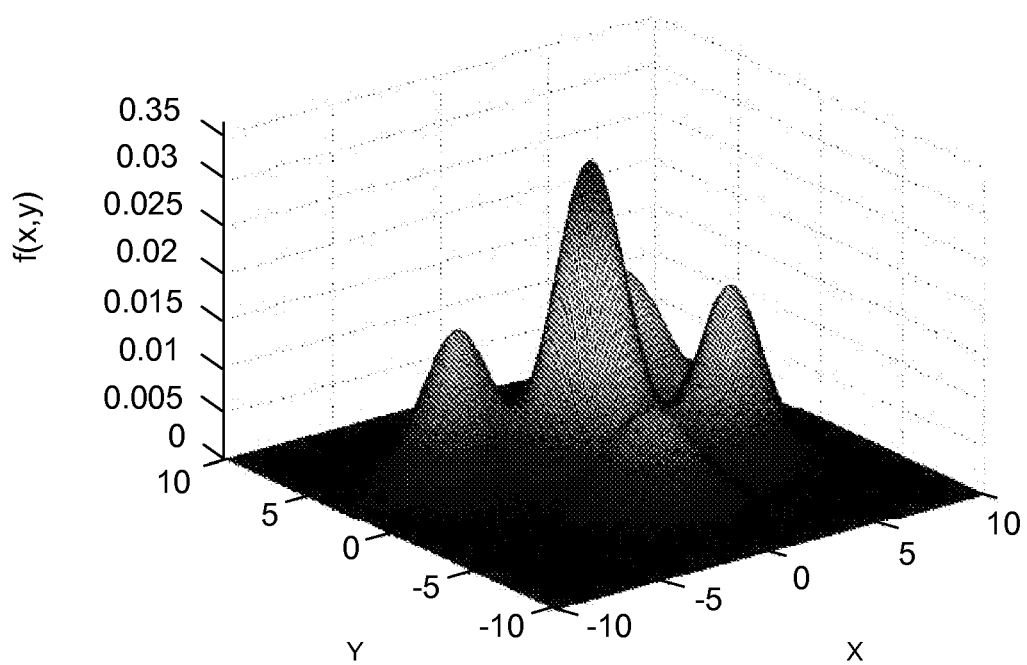

FIG. 6a shows an exemplary graph showing the distributed estimation result on a random chosen node for example a node i, where the X-axis and Y-axis represents the 2D data samples and the Z-axis represents the distributed KDE values for the respective data samples of node i.

Figure 6B:
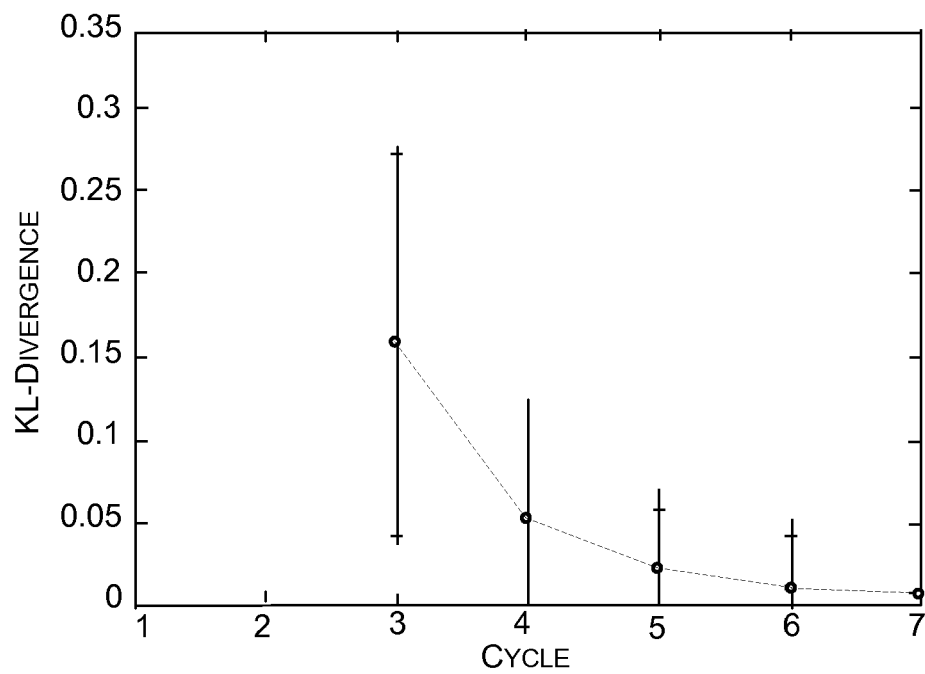

FIG. 6b shows an exemplary graph showing the change in the KL-divergence values for each gossip cycle. Here the X-axis represents the gossip cycles and the Y-axis represents the K-L divergence values for all nodes. The convergence trend in the 2D case is similar with the 1D case.

To test the robustness of the above exemplary process, the situation where nodes fail frequently during the process is simulated. At the beginning of each gossip cycle, $N \times P_f$ nodes may be randomly selected and discarded from the computing environment 100. The failure rate represented by $P_f$ ranges from 5% to 30%.

Figure 7A:
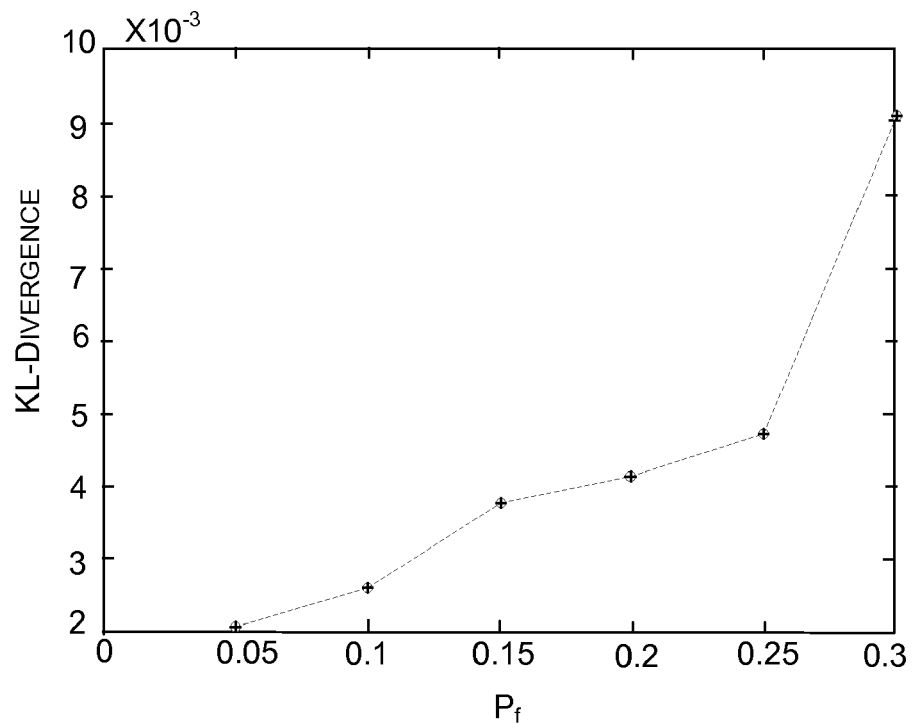
FIG. 7a illustrates an exemplary graph showing a change of KL-Divergence values when some of the nodes fail.
Figure 7B:
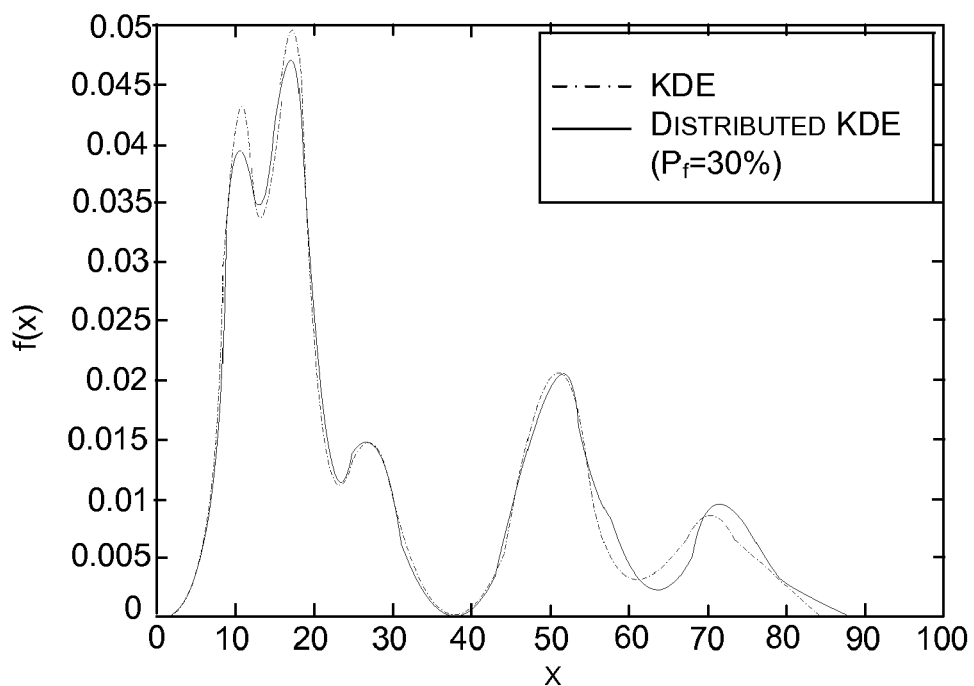
FIG. 7b illustrates an exemplary graph illustrating estimation result of global and distributed kernel density under a node failure situation.

FIGS. 7a & 7b show an exemplary graph showing an impact of node failures in the estimation result. FIG. 7a shows an exemplary graph showing the changes in the KL-Divergence values when some nodes fail.

FIG. 7b shows an exemplary graph showing the estimation result of global and distributed kernel density under the node failure situations. It is inferred that the estimation result is acceptable even when there are high percentages of nodes failing in each cycle.

Exemplary Computing System

Figure 8:
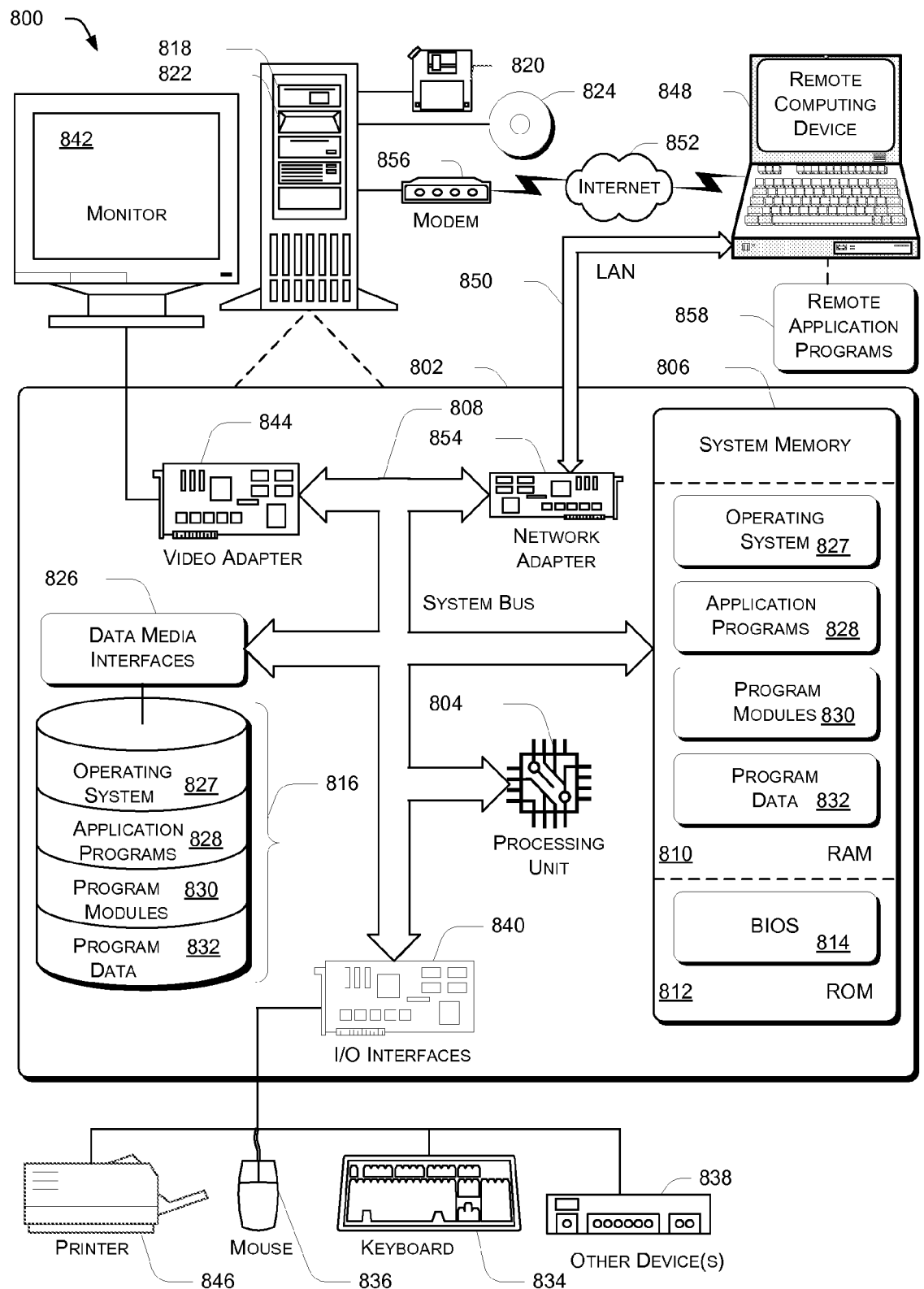
FIG. 8 illustrates an exemplary computing device system for implementing distributed kernel density estimation.

FIG. 8 illustrates an exemplary general computer environment 800, which can be used to implement the techniques described herein, and which may be representative, in whole or in part, of elements described herein. The computer environment 800 is only one example of a computing environment and is not intended to suggest any limitation as to the scope of use or functionality of the computer and network architectures. Neither should the computer environment 800 be interpreted as having any dependency or requirement relating to any one or combination of components illustrated in the example computer environment 800.

Computer environment 800 includes a general-purpose computing-based device in the form of a computer 802. Computer 802 can be, for example, a desktop computer, a handheld computer, a notebook or laptop computer, a server computer, a game console, and so on. The components of computer 802 can include, but are not limited to, one or more processors or processing units 804, a system memory 806, and a system bus 808 that couples various system components including the processor 804 to the system memory 806.

The system bus 808 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 802 typically includes a variety of computer readable media. Such media can be any available media that is accessible by computer 802 and includes both volatile and non-volatile media, removable and non-removable media.

The system memory 806 includes computer readable media in the form of volatile memory, such as random access memory (RAM) 810, and/or non-volatile memory, such as read only memory (ROM) 812. A basic input/output system (BIOS) 814, containing the basic routines that help to transfer information between elements within computer 802, such as during start-up, is stored in ROM 812. RAM 810 typically contains data and/or program modules that are immediately accessible to and/or presently operated on by the processing unit 804.

Computer 802 may also include other removable/non-removable, volatile/non-volatile computer storage media. By way of example, FIG. 8 illustrates a hard disk drive 816 for reading from and writing to a non-removable, non-volatile magnetic media (not shown), a magnetic disk drive 818 for reading from and writing to a removable, non-volatile magnetic disk 820 (e.g., a "floppy disk"), and an optical disk drive 822 for reading from and/or writing to a removable, non-volatile optical disk 824 such as a CD-ROM, DVD-ROM, or other optical media. The hard disk drive 816, magnetic disk drive 818, and optical disk drive 822 are each connected to the system bus 808 by one or more data media interfaces 826. Alternately, the hard disk drive 816, magnetic disk drive 818, and optical disk drive 822 can be connected to the system bus 808 by one or more interfaces (not shown).

The disk drives and their associated computer-readable media provide non-volatile storage of computer readable instructions, data structures, program modules, and other data for computer 802. Although the example illustrates a hard disk 816, a removable magnetic disk 820, and a removable optical disk 824, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 816, magnetic disk 820, optical disk 824, ROM 812, and/or RAM 810, including by way of example, an operating system 827, one or more application programs 828, other program modules 830, and program data 832. Each of such operating system 827, one or more application programs 828, other program modules 830, and program data 832 (or some combination thereof) may implement all or part of the resident components that support the distributed file system.

A user can enter commands and information into computer 802 via input devices such as a keyboard 834 and a pointing device 836 (e.g., a "mouse"). Other input devices 838 (not shown specifically) may include a microphone, joystick, game pad, satellite dish, serial port, scanner, and/or the like. These and other input devices are connected to the processing unit 804 via input/output interfaces 840 that are coupled to the system bus 808, but may be connected by other interface and bus structures, such as a parallel port, game port, or a universal serial bus (USB).

A monitor 842 or other type of display device can also be connected to the system bus 808 via an interface, such as a video adapter 844. In addition to the monitor 842, other output peripheral devices can include components such as speakers (not shown) and a printer 86 which can be connected to computer 802 via the input/output interfaces 840.

Computer 802 can operate in a networked environment using logical connections to one or more remote computers, such as a remote computing-based device 848. By way of example, the remote computing-based device 848 can be a personal computer, portable computer, a server, a router, a network computer, a peer device or other common network node, and the like. The remote computing-based device 848 is illustrated as a portable computer that can include many or all of the elements and features described herein relative to computer 802.

Logical connections between computer 802 and the remote computer 848 are depicted as a local area network (LAN) 440 and a general wide area network (WAN) 842. Such networking environments are commonplace in offices, enterprise-wide computer networks, intranets, and the Internet.

When implemented in a LAN networking environment, the computer 802 is connected to a local network 840 via a network interface or adapter 844. When implemented in a WAN networking environment, the computer 802 typically includes a modem 846 or other means for establishing communications over the wide network 842. The modem 846, which can be internal or external to computer 802, can be connected to the system bus 808 via the input/output interfaces 840 or other appropriate mechanisms. It is to be appreciated that the illustrated network connections are exemplary and that other means of establishing communication link(s) between the computers 802 and 848 can be employed.

In a networked environment, such as that illustrated with computing environment 800, program modules depicted relative to the computer 802, or portions thereof, may be stored in a remote memory storage device. By way of example, remote application programs reside on a memory device of remote computer 848. For purposes of illustration, application programs and other executable program components such as the operating system are illustrated herein as discrete blocks, although it is recognized that such programs and components reside at various times in different storage components of the computing-based device 802, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that performs particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

CONCLUSION

Although the systems and methods for distributed kernel density estimation have been described in language specific to structural features and/or methodological operations or actions, it is understood that the implementations defined in the appended claims are not necessarily limited to the specific features or actions described. Rather, the specific features and operations of are disclosed as exemplary forms of implementing the claimed subject matter.

What is claimed is:

1. A system comprising:
   a distributed network; and
   plurality of node devices connected to the distributed network, each node device having local measurements that are independent and identical distributed samples of a random variable, wherein each node device uses gossip-based distributed kernel density estimation to estimate an unknown distribution from the distributed samples using kernel density estimation comprising:
      obtaining the random values with an unknown distribution from each of the node devices;
      maintaining a local kernel set of each of the node devices;
      selecting from the plurality of node devices, a random node as a gossip target node;
      exchanging kernels from the gossip target node with each one of the remaining node devices;
      merging kernels with target node and kernels of each of the remaining nodes devices;
      determining whether the merged kernels exceed the resources of a particular node device of the remaining node devices; and
      performing a data reduction if the merged kernels exceed the resources of the particular node device.

2. The system of claim 1, wherein the node devices are one or more of the following: a personal computer, a sensor, a peer, or an agent.

3. The system of claim 1, wherein the kernel density estimation is defined as:

$$\hat{f}(x) = \sum_{i=1}^{N} w_i K_{H_i}(x - x_i),$$

4. The system of claim 1, wherein each node receives a probability density function by collecting information and approximating a global kernel density estimation through a gossip process.

5. The system of claim 1, wherein each node device receives a unique and increasing round identifier attached to a gossip message that distinguishes gossip messages of each round.

6. The system of claim 1, wherein a node device joins the distributed kernel density estimation when the node device receives a round identifier having a value greater than a value of a current round.

7. A method to estimate kernel density comprising of:
obtaining a sample random value with an unknown distribution from each node of a plurality of nodes in a computing system;
maintaining a local kernel set of each of the nodes;
selecting from the plurality of nodes, a random node as a gossip target node;
exchanging kernels from the gossip target node with each one of the remaining nodes;
merging kernels with target node and kernels of each of the remaining nodes;
determining whether the merged kernels exceed the resources of a particular node of the remaining nodes; and
performing a data reduction, if the merged kernels exceed the resources of the particular node.

8. The method of claim 7 further comprising updating a kernel set of each of the plurality of nodes.

9. The method of claim 7 further comprising determining a number of gossip cycles that have been completed for the computing system.

10. The method of claim 9, wherein the number of gossip cycles is used to calculate a global kernel density estimate, when the number of gossip cycles is completed.

11. The method of claim 9, wherein a local kernel estimate is performed at each of the nodes, if the number of gossip cycles is not completed.

12. The method of claim 7, wherein a passive exchange is performed between the random node and one or more of the remaining nodes.

13. The method of claim 7, wherein a local density estimation at each of the nodes is defined by:

$$\hat{f}(x) = \sum_{i=1}^{N} w_i K_{H_i}(x - x_i),$$

14. The method of claim 7, wherein resource limitation of each of the nodes determines the exchange of kernels between the nodes.

15. A method of data reduction in a computing system comprising of:
receiving a value representing a kernel set of a number of kernels in a node of the computing system;
receiving a value representing a value of compressed kernel set of the node;
determining whether the value representing the kernel set is greater than the value of the compressed kernel set;
determining two kernels of the node form the kernel set if the value representing the kernel set is greater than the value of the compressed kernel set, wherein the centers of the two determined kernels are selected having minimal distance between one another;
merging the two kernels into a new kernel;
removing the two kernels form the kernel set; and
creating a kernel set.

16. The method of claim 15, wherein the value representing the kernel set of the number of kernels in the node is represented by a temporary variable value.

17. The method of claim 15, wherein the merging is performed when the determining whether the value representing the kernel set is greater than the value of the compressed kernel set is determined to be not true.

18. The method of claim 15, wherein the merging is performed by to following:

$$w'_j = w_{j_1} + w_{j_2}$$

$$x'_j = \frac{w_{j_1} x_{j_1} + w_{j_2} x_{j_2}}{w_{j_1} + w_{j_2}}$$

$$H'_j = \frac{w_{j_1}(H_{j_1} + x_{j_1} x_{j_1}^T) + w_{j_2}(H_{j_2} + x_{j_2} x_{j_2}^T)}{w_{j_1} + w_{j_2}} - x'_j x'^T_j$$

19. The method of claim 15, wherein the number of iterations performed equals the difference between the value representing the kernel set of the number of kernels in the node and the value representing the compressed kernel set of the node.

20. The method of claim 15 further comprising outputting a kernel set of kernels approximating an original density estimate.

* * * * *